(12) United States Patent
Prasad

(10) Patent No.: US 11,957,134 B2
(45) Date of Patent: Apr. 16, 2024

(54) METHOD OF MAKING A PLANT-BASED PROTEIN COMPOSITION RICH IN GLUTAMIC ACID

(71) Applicant: Kodimule Shyam Prasad, Bangalore (IN)

(72) Inventor: Kodimule Shyam Prasad, Bangalore (IN)

(73) Assignee: Vidya Herbs, Inc., Fullerton, CA (US)

( * ) Notice: Subject to any disclaimer, the term of this patent is extended or adjusted under 35 U.S.C. 154(b) by 163 days.

(21) Appl. No.: 17/666,947

(22) Filed: Feb. 8, 2022

(65) Prior Publication Data

US 2022/0248702 A1 Aug. 11, 2022

Related U.S. Application Data

(60) Provisional application No. 63/146,882, filed on Feb. 8, 2021.

(51) Int. Cl.
*A23F 5/02* (2006.01)
*A23F 5/18* (2006.01)
*A23F 5/24* (2006.01)
*A23F 5/28* (2006.01)
*A23L 33/105* (2016.01)

(52) U.S. Cl.
CPC ............... *A23F 5/02* (2013.01); *A23F 5/18* (2013.01); *A23F 5/243* (2013.01); *A23F 5/246* (2013.01); *A23F 5/28* (2013.01); *A23L 33/105* (2016.08)

(58) Field of Classification Search
CPC ...... A23F 5/02; A23F 5/18; A23F 5/28; A23F 5/243; A23F 5/246; A23L 33/105
See application file for complete search history.

(56) References Cited

U.S. PATENT DOCUMENTS

| 2006/0115517 A1* | 6/2006 | Tsuchiya | A23L 33/11 514/566 |
| 2014/0127144 A1* | 5/2014 | Yang | A23L 27/63 426/534 |
| 2021/0022378 A1* | 1/2021 | Kim | A23L 19/03 |

FOREIGN PATENT DOCUMENTS

| CN | 102697168 | * 10/2012 |
| JP | 56131340 | * 10/1981 |
| JP | 61271969 | * 12/1986 |
| JP | 2010187554 | * 9/2010 |
| JP | 2011244812 | * 12/2011 |

OTHER PUBLICATIONS

Dong et al. Sep. 2015. Molecules. vol. 20. https://www.ncbi.nlm.nih.gov/pmc/articles/PMC6332462/.*
English translation for JP2011244812 published Dec. 8, 2011.*
English Translation for CN102697168 published Oct. 2, 2012.*
English Translation for JP2010187554 published Sep. 2, 2010.*
English Translation for JP61271969 published Dec. 2, 1986.*
English Translation for JP56131340 published Oct. 14, 1981.*

* cited by examiner

*Primary Examiner* — Anthony J Weier
(74) *Attorney, Agent, or Firm* — TMB Law; Timothy M. Brown

(57) ABSTRACT

The invention relates to a plant-based glutamic acid rich protein composition and method of making the same. The composition provides a spectrum of amino acids, including an abundance of glutamic acid. The composition is free of the antibiotics and growth hormones associated with animal-sourced proteins and does not require amino acid supplementation to achieve high levels of glutamic acid. In some aspects, the composition is obtained from coffee beans, including defatted green coffee beans.

16 Claims, No Drawings

METHOD OF MAKING A PLANT-BASED PROTEIN COMPOSITION RICH IN GLUTAMIC ACID

CROSS-REFERENCE TO RELATED APPLICATIONS

This application claims the benefit of Provisional Application No. 63/146,882, filed Feb. 8, 2021, the entire contents of which are incorporated herein by reference for all purposes.

FIELD OF THE INVENTION

The invention generally relates to protein compositions for human and non-human consumption.

BACKGROUND OF THE INVENTION

Proteins in our body account for a variety of structural and biological functions. Proteins are formed from amino acids, the building blocks of bone, muscle and skin. Of the 20 amino acids there are nine essential amino acids which cannot be synthesized by the body and must be acquired through the diet. Animal and plant proteins are a rich source of essential amino acids attributing to multiple health benefits. However, animal-sourced proteins are associated with the issues of antibiotics and exogenous growth hormones.

Plant-based proteins in our diet have a great impact on nutritional value. Unlike other sources of protein, plant proteins also provide a source of fiber. Plant protein supplements help to curb excess body weight by appetite suppression (Neacsu et al. 2014). Clinical data from previous studies suggest that dietary intake of plant proteins is inversely associated with blood pressure and hypertension (Mehrabani et al. 2017; Blumenthal et al. 2010; He et al. 2005). Dietary proteins, especially plant proteins, reduce the risk of cardiovascular disease. Nevertheless, the use of plant proteins in supporting muscle mass maintenance is limited due to their lower anabolic potential compared to animal proteins. Strategies to improve the amino acid composition of plant-based proteins include fortifying them with glutamic acid to potentiate their use in muscle growth and age-related muscle loss (Berrazaga et al. 2019). This however complicates manufacturing and increases costs.

Glutamic acid, abbreviated as Glu, is an important amino acid for the synthesis of proteins. The salts and carboxylate anions associated with glutamic acid are referred to as glutamates. Glutamic acid contributes to the health of the immune and digestive systems, as well as energy production. Muscle tissues are an important site for storing and producing glutamic acid. Each day the muscles release approximately 80 g of glutamic acid into the circulation to be used throughout the body.

One of the major roles of glutamic acid is as an excitatory neurotransmitter within the central nervous system. It is the most common neurotransmitter present in the spinal cord and brain. As a neurotransmitter, glutamic acid influences several areas of the brain including the thalamus, brain stem, spinal cord, basal ganglia, and pons. Glutamic acid stimulates mental alertness and improved memory function. Because of the important role this amino acid has in cognitive function, some medical practitioners recommend supplementation to treat conditions such as attention deficit hyperactivity disorder (ADHD). Furthermore, glutamic acid is very important in the treatment of conditions such as bipolar disorder, schizophrenia, depression, anxiety, and other mood related disorders. Studies have shown that individuals that suffer from these conditions typically have an unbalanced ratio or concentration of neurotransmitters.

In addition to being a neurotransmitter, glutamic acid is also important in the synthesis of gamma-aminobutyric acid (GABA). An inhibitory neurotransmitter, GABA has the opposite effect of glutamic acid and decreases activity within the central nervous system. Due to glutamic acid's influence on other neurotransmitters, it has an integral role in a number of neuropsychological conditions. Low GABA levels are frequently associated with severe depression, neuroticism, anxiety, and manic mood states. There may also be a link between glutamic acid and aggression, with studies showing that mice engaged in aggressive behavior have low levels of GABA and glutamic acid.

What is needed in the art is a process for manufacturing a protein composition that provides the benefits of being high in glutamic acid, without requiring glutamic acid supplementation during the manufacturing process or containing the exogenous hormones or antibiotics that are associated with animal-based protein sources.

SUMMARY OF THE INVENTION

The inventor surprisingly discovered a method of making a protein composition that is rich in glutamic acid and sourced from plant material. The composition is free of the growth hormones and antibiotics associated with animal-sourced protein, and is rich in glutamic acid without the need for specific amino acid supplementation.

Thus, an objective of the invention is to provide a method of obtaining a protein composition rich in glutamic, comprising: providing a coffee bean material; and extracting protein from the coffee bean material thereby producing a protein composition that is rich in glutamic acid, wherein the protein composition: (i) contains glutamic acid in an amount that is proportionately greater than the amount of any other amino acid that is present in the protein composition, (ii) contains by dry weight at least about 7% glutamic acid, or (iii) a combination thereof.

In some aspects, the protein is extracted under aqueous conditions.

In some aspects, extracting protein from the coffee bean material comprises treating the coffee bean material with at least one enzyme.

In some aspects, the enzyme comprises one or more enzymes selected from L120 and L100.

In some aspects, the protein composition is filtered and the filtrate and/or solution is dried.

In some aspects, the coffee bean material comprises one or more materials selected from green coffee beans and roasted coffee beans.

In aspects, the coffee beans comprise defatted coffee beans.

In some aspects, the protein composition contains by dry weight about 30% to about 35% protein.

In some aspects, the protein composition contains by dry weight at least about 7% glutamic acid.

In some aspects, the protein composition contains by dry weight between about 7% and about 8% glutamic acid.

In some aspects, the protein composition contains by dry weight at least about 4% glycine.

In some aspects, the protein composition contains by dry weight between about 4% and about 5% glycine.

In some aspects, the protein composition is in combination with a dietary supplement, nutritional supplement, food, or beverage.

A further objective of the invention is to provide a glutamic acid rich protein composition, comprising protein extracted from a coffee bean material, wherein the protein: (i) contains glutamic acid in an amount that is greater than the amount of any other amino acid that is present in the protein composition, (ii) contains by dry weight at least about 7% glutamic acid, or (iii) a combination thereof.

In some aspects, the coffee bean material comprises one or more materials selected from green coffee beans and roasted coffee beans.

In some aspects, the coffee beans comprise defatted coffee beans.

In some aspects, the composition contains by dry weight between about 30% and about 35% protein.

In some aspects, the protein composition contains by dry weight at least about 7% glutamic acid.

In some aspects, the protein composition contains by dry weight between about 7% and about 8% glutamic acid.

In some aspects, the protein composition contains by dry weight at least about 4% glycine.

In some aspects, the protein composition contains by dry weight between about 4% and about 5% glycine.

In some aspects, the protein composition is in combination with a dietary supplement, nutritional supplement, food, or beverage.

A further objective of the invention is to provide a reaction mixture for extracting a glutamic acid rich protein composition from a coffee bean material, comprising a mixture of coffee bean material and at least one enzyme.

In some aspects, the at least one enzyme is an isolated enzyme.

In some aspects, the at least one enzyme comprises one or more enzymes selected from L120 and L100.

In some aspects, the coffee bean material comprises one or more materials selected from green coffee beans and roasted coffee beans.

In some aspects, at least a portion of the coffee beans are defatted.

Definitions

As used herein, the term "about" means the value that is stated, and includes the stated value which varies (plus or minus) by as much as 30%, 25%, 20%, 15%, 10%, 9%, 8%, 7%, 6%, 5%, 4%, 3%, 2% or 1%.

As used herein, the phrase "coffee bean material" refers to coffee beans or a material containing or derived from coffee beans.

As used herein, the terms "dry," "drying," "dried," and the like, refer to a condition wherein the referenced material is free of water and/or other solvent, or contains water and/or the other solvent in an amount that is less than about 20%, less than about 15%, less than about 10%, less than about 5%, less than about 4%, less than about 3%, less than about 2%, or less than about 1%.

As used herein, the terms "treat," "treating," and "treatment" when used in reference to a condition or disorder means the clinical intervention of the disorder or condition in an attempt to alter, alleviate, ameliorate, prevent, inhibit, or reverse the progression or symptoms of the disorder or condition.

As used herein, the phrases "glutamic acid rich" and "high in glutamic acid" refer to a condition in which glutamic acid is the most abundant amino acid present in the subject composition or material, and/or that the referenced composition or material contains at least about 7% w/w glutamic acid.

DETAILED DESCRIPTION

The inventor surprisingly discovered a method of making a glutamic-acid-rich (GAR) protein composition from coffee beans. The GAR protein composition is free of antibiotics and hormones which are typically associated with animal-sourced protein compositions. Additionally, the glutamic acid content of the GAR composition provides significant health benefits for treating conditions and disorders that benefit from glutamic acid supplementation.

In some embodiments, the invention provides a method of making a GAR protein composition. The method can be practiced by providing a coffee bean material containing protein, and extracting at least a portion of the protein from the coffee bean material to produce a protein extract, wherein the protein extract is rich in glutamic acid.

The GAR protein composition can contain by dry weight at least about 4%, at least about 5%, at least about 6%, at least about 7%, at least about 8%, at least about 9%, at least about 10%, at least about 15%, or at least about 20% glutamic acid. In one non-limiting embodiment, the glutamic-acid-rich protein composition contains by dry weight between about 7% and about 8% glutamic acid, between about 7% and about 10% glutamic acid, or between about 7% and about 20% glutamic acid. The GAR protein composition can be proportionately high in glutamic acid such that the composition has an amount of glutamic acid that is greater than any other amino acid that is present in the composition.

The method of making the GAR composition can further comprise the step of filtering the GAR protein composition following the extracting step. Filtering the GAR protein composition can produce a filtrate that comprises at least a portion of the protein that is produced by the extracting step. The filtrate can optionally be dried to remove substantially all of the solution that is used to enzymatically treat the coffee bean material. In some embodiments, the solution is filtered and dried to produce the GAR protein composition.

In some embodiments, the step of extracting protein from coffee bean material comprises treating the coffee bean material with one or more enzymes. The treating step can comprise treating the coffee bean material with a mixture containing one or more enzymes. The mixture can be an aqueous solution. Suitable enzymes for use with the invention include, but are not limited to, cell-wall-digesting enzymes, cell-storage-component-digesting enzymes, phenol oxidase enzymes, or combinations thereof. In one non-limiting embodiment, the enzyme includes SCOTTZYME KS from Scott Laboratories (Petaluma, Calif.) which contains a blend of enzymes from *Aspergillus niger*. In one non-limiting embodiment, the enzyme includes at least one of L120 and L100 enzyme from Noor Enzymes Pvt Ltd, Kolkata, India.

As used herein, the term "cell-wall-digesting enzymes" refers to enzymes which are capable of breaking down one or more coffee cell wall constituents to simpler materials and thus reduces the structural integrity or increases the permeability of the cell wall. Coffee cell walls are composed primarily of cellulose and hemicellulose, but contain lesser amounts of glucans, mannans, pectins and lignins. Accordingly, suitable cell-wall-digesting enzymes include, but are not limited to, cellulases and hemicellulases (e.g. rohalase, rohapect and rohament, made by Rohmtech), pectinases, glucanases, mannases, and ligninases.

As used herein, the term "cell-storage-component-digesting enzymes" refers to enzymes which are capable of breaking down components stored in the coffee cell. Suitable cell-storage-component-digesting enzymes include, but are not limited to, the amylases, glucosidases, mannosidases, dextranases, proteases such as papain and coralase L10, exoproteases, endoproteases, phosphatases, phytases, phospholipases, lipases and nucleases. As used herein, the term "phenol oxidase" refers to enzymes which are capable of oxidizing, or otherwise chemically altering the phenolic compounds (or their precursors) present in coffee beans before or after development by roasting. Phenol oxidase enzymes include, but are not limited to, the catechol oxidases, laccases, cresolases, monophenol oxidases, diphenol oxidases, or combinations thereof Examples of suitable phenol oxidase enzymes include, but are not limited to, tyrosinase, phenolase, as well as plant extracts such as tea extracts, apple juice, pear juice and grape juice containing phenol oxidase enzymes, for example.

Some aspects of the invention concern the conditions under which the coffee bean material is treated with one or more enzymes to extract the GAR protein composition. Treating the coffee bean material can include at least one of contacting, combining, mixing, and incubating the coffee bean material with one or more the enzymes disclosed herein. The coffee bean material can be treated with an effective amount of the one or more enzymes. What constitutes "an effective amount" will depend on the particular enzyme(s) involved, the effects desired during treatment of the coffee bean material, temperature of the reaction mixture, the amount of material being treated, and like factors. The enzyme(s) in the treatment mixture can be from about 0.0005% to about 0.1% by weight of the coffee bean material. In some aspects, the enzyme(s) included in the treatment mixture is from about 0.005% to about 0.05% by weight.

At least one aspect of the invention concerns the coffee bean material from which the protein composition of the present invention is extracted. As used herein, the phrase "coffee bean material" refers to coffee beans or a material containing or derived from coffee beans. The coffee bean material can include whole coffee beans, crushed coffee beans, coffee bean powder, or combinations thereof. Suitable coffee beans for the coffee bean include, but are not necessarily limited to, green coffee beans, dried coffee beans, fully roasted coffee beans, partially roasted coffee beans, or combinations thereof. Examples of suitable coffee beans include, but are not necessarily limited to, *Coffea arabica, Coffea robusta*, and the like. In some aspects, the protein composition is extracted from coffee cherry, coffee cherry mucilage, coffee beans, or a combination thereof. In one non-limiting aspect of the invention, the coffee beans are defatted. The coffee bean material can be in the form of a powder, paste, solution, gel, colloid, suspension, or sol.

In some aspects, the method of making the GAR protein composition of the invention further comprises combining the composition with one or more carriers, excipients, or a combination thereof. Suitable excipients include, but are not limited to, binders, fillers, bulking agents, flow aids/glidents, disintegrants, lubricants, stabilizers, surfactants, or combinations thereof. Suitable excipients and carriers for use with the composition include, but are not limited to, those disclosed in: Remington: The Science and Practice of Pharmacy, 19$^{th}$ Ed (Easton, Pa.: Mack Publishing Company, 1995); Hoover, John E., Remington's Pharmaceutical Sciences, (Easton, Pa.: Mack Publishing Co 1975); Liberman, H. A. and Lachman, L., Eds., Pharmaceutical Dosage Forms (New York, N.Y.: Marcel Decker 1980); and Pharmaceutical Dosage Forms and Drug Delivery Systems, Seventh Ed (Lippincott Williams & Wilkins 1999). The entire contents of these publications are incorporated herein by reference for all purposes.

In at least one aspect, the GAR protein composition of the invention is formulated to assume a particular form. The composition can be formulated in the form of a powder, liquid, pill, tablet, pellet, capsule, thin film, solution, spray, syrup, linctus, lozenge, pastille, chewing gum, paste, vapor, suspension, emulsion, ointment, cream, lotion, liniment, drop, topical patch, buccal patch, bead, gummy, gel, sol, injection, or combinations thereof. The composition can be formulated for oral administration. The composition can be combined with vitamins, minerals, amino acids, proteins, extracts, carbohydrates, lipids, fatty acids, caffeine, flavourings, sweeteners, preservatives, or combinations thereof. In some embodiments, the composition is combined with a nutritional supplement, food supplement, or beverage. The composition can be formulated in bulk for use in the manufacture of nutritional supplements, food supplements, foods, and beverages. Bulk formulations can be sealed in containers, such as drums or bags, so as to inhibit the oxidation of the active components of the composition.

Glutamic acid is known to be involved in a wide range of physiological processes. It is also known that administering glutamic acid can have beneficial effects on redressing a variety of disorders and conditions that are associated with glutamic acid metabolism. The composition of the invention provides a wide spectrum of amino acids that is rich in glutamic acid. Accordingly, in some embodiments, the invention provides a method of use comprising administering to a patient in need thereof, a glutamic acid rich composition as disclosed herein. The patient can be a human or non-human patient, such as agricultural and companion animals. The composition can be administered to treat a disorder in the patient, such as, for example: epilepsy; muscular dystrophy; low blood sugar (e.g. in diabetics); bipolar disorder; schizophrenia; chest pain associated with coronary heart disease; depression; anxiety, manic mood states, and other mood related disorders; attention deficit hyperactivity disorder (ADHD); benign prostatic hyperplasia; personality and behavioural issues (especially in children); or combinations thereof. In some aspects, the composition is administered to the patient to prevent nerve damage (e.g. in chemotherapy patients), to improve cognitive function, to improve memory, to improve mental alertness, to increase exercise tolerance, to improve muscle recovery, to improve muscle growth, to inhibit muscle loss, or combinations thereof.

The forgoing detailed description and the following examples describe some, but not necessarily all, examples or embodiments of the invention. The described embodiments are to be considered in all respects only as illustrative and not restrictive. It will be understood that the scope of the invention is defined by the claims, including their obvious and functional equivalents.

Aspects of the present invention are exemplified in the following examples. Example 1 describes the extraction process for an embodiment of the composition of the invention. Example 2 relates the quantification of this embodiment, while Example 3 describes the amino acid profile of the embodiment.

Example 1: Preparation of a Glutamic-Acid-Rich Protein Composition

The extraction process described in this example can be scaled up to produce larger quantities of the composition. The details provided for preparation of this embodiment of the composition should not be considered as limiting. The quantities and times described below can be varied substantially to extract protein from green coffee beans in accordance with the invention.

Method 1: 100 kg of 2-3 mm sized defatted green coffee bean raw material powder was charged into a clean 2.0 kL extractor. To this about 800-1000 L of demineralized or reverse osmosis water and 500 mL of L120 or L100 enzymes procured from Noor Enzymes Pvt Ltd., Kolkata, India or similar enzymes were added. Extraction was performed at 25-28° C. with continuous circulation of solvent using process pump up to 5-6 h followed by filtration through 2μ filter cloth. The resultant filtrate was concentrated under vacuum at 65-70° C. until the volume reached to 20-25 L which was subsequently spray dried at 170-180° C. The final yield of coffee protein extract was about 5-7 kg.

Method 2: 100 kg of 2-3 mm sized defatted green coffee bean raw material powder was charged into a clean 2.0 kL extractor. About 800-1000 L of demineralized or reverse osmosis water was added; 500 mL of L120 or L100 enzymes procured from Noor Enzymes Pvt Ltd, Kolkata, India or similar enzymes was mixed. Extraction was performed at 40-45° C. with continuous circulation of solvent using process pump up to 5-6 h and filtered through 2μ filter cloth. The resultant filtrate was concentrated under vacuum at 65-70° C. until volume reached to 25-30 L. The filtrate was spray dried at 170-180° C. to yield coffee protein powder of about 8-10 kg.

Example 2: Quantification of Total Protein by Kjeldahl Method

The Kjeldahl method was done according to AOAC method. Approximately 0.2 g of dried filtrate from Example 1 was weighed into a digestion flask. The sample was digested with 10 mL of boiling concentrated sulfuric acid, with the addition of 3 g of catalytic mixture of potassium sulfate and copper sulfate (5:1) in the digestion block (KjelTRON, India) at 420° C. for 2 h. After digestion the sample turned to bluish green colour; the digestion flask was connected for distillation. The solution in the digestion flask was then made alkaline by addition of 40% sodium hydroxide, which converts the ammonium sulfate into ammonia gas. The ammonia was distilled out into the receiving flask which contained 25 mL of 4% boric acid, 4 drops each of methyl red and bromocresol green indicator solutions. The ammonia was determined with titration against standardized 0.1 N hydrochloric acid solution until the distilled solution color turned from bluish green to pale pink. Determinations were made on all reagents alone (blank determinations). The result was expressed in % N and protein (% N×factor).

$$\% \text{ of Nitrogen} = \frac{14 \times N \text{ of Acid} \times (\text{Sample titrant value} - \text{Blank}) \times 100}{\text{Sample weight} \times 100}$$

% of Protein = % of Nitrogen × Power Factor (6.25)

The total protein content in the coffee protein was quantified to 30-35 w/w %.

Example 3. Determination of Amino Acid Profile

The composition from Example 1 was analyzed for its amino acid profile (Eurofins, Bangalore, India). It was found that seventeen amino acids were present in the composition with the quantity ranging from 0.1-8% (Table 1).

TABLE 1

Amino Acid Profile of Protein Composition

| Amino acid | Content (g/100 g) |
|---|---|
| Alanine | 1.22 |
| Arginine | 1.12 |
| Aspartic acid | 3.74 |
| Cystein + Cystine | 0.09 |
| Glutamic acid | 7.76 |
| Glycine | 4.25 |
| Histidine | 0.34 |
| Isoleucine | 1.29 |
| Leucine | 2.09 |
| Lysine | 1.16 |
| Methionine | 0.10 |
| Phenylalanine | 1.68 |
| Proline | 1.30 |
| Serine | 1.55 |
| Threonine | 0.43 |
| Tyrosine | 0.66 |
| Valine | 1.88 |
| | 30.66 |

REFERENCES

Neacsu M, Fyfe C, Horgan G, Johnstone A M. Appetite control and biomarkers of satiety with vegetarian (soy) and meat-based high-protein diets for weight loss in obese men: a randomized crossover trial. Am J Clin Nutr. 2014; 100(2): 548-58.

Mehrabani S, Asemi M, Najafian J, Sajjadi F, Maghroun M, Mohammadifard N. Association of Animal and Plant Proteins Intake with Hypertension in Iranian Adult Population: Isfahan Healthy Heart Program. Adv Biomed Res. 2017; 6: 112.

Blumenthal J A, Babyak M A, Hinderliter A, Watkins L L, Craighead L, Lin P H, et al. Effects of the DASH diet alone and in combination with exercise and weight loss on blood pressure and cardiovascular biomarkers in men and women with high blood pressure: the ENCORE study. Arch Intern Med. 2010; 170(2):126-35.

He J, Gu D, Wu X, Chen J, Duan X, Chen J, et a-l. Effect of soybean protein on blood pressure: a randomized, controlled trial. Ann Intern Med. 2005; 143(1):1-9.

Berrazaga I, Micard V, Gueugneau M, Walrand S. The role of the anabolic properties of plant- versus animal-based protein sources in supporting muscle mass maintenance: A Critical Review. Nutrients. 2019; 11(8): E1825.

Górnaś P, Siger A, Pugajeva I, Czubinski J, Waśkiewicz A, Polewski K. New insights regarding tocopherols in *Arabica* and *Robusta* species coffee beans: RP-UPLC-ESI/MSn and NP-HPLC/FLD study. J Food Comp Anal. 2014; 36:117-123.

Gómez-Ruiz J A, Leake D S, Ames J M. In vitro an-tioxidant activity of coffee compounds and their metabolites. J Agric Food Chem. 2007; 55: 6962-6969.

Franca A S, Mendonca J C F, Oliveira S D. Composition of green and roasted coffees of different cup qualities. LWT Food Sci Technol. 2005; 38: 709-715.

Daoudal G, Debanne D. Long-term plasticity of intrinsic excitability: learning rules and mechanisms. Learn Mem. 2003; 10(6): 456-65.

Frebel K, Wiese S. Signalling molecules essential for neuronal survival and differentiation. Biochem Soc Trans. 2006; 34(Pt 6): 1287-90.

Kawai N, Sakai N, Okuro M, Karakawa S, Tsuneyoshi Y, Kawasaki N, et al. The sleep-promoting and hypothermic effects of glycine are mediated by NMDA receptors in the suprachiasmatic nucleus. Neuropsychopharmacology. 2015; 40(6): 1405-1416.

Bannai M, Kawai N, Ono K, Nakahara K, Murakami N. The effects of glycine on subjective daytime performance in partially sleep-restricted healthy volunteers. Front Neurol. 2012; 3: 61.

Petty F. GABA and mood disorders: a brief review and hypothesis. Journal of Affective Disorders. Internet. 1995. 34(4):275-81. Available from: http://www.ncbi.nlm.nih.gov/pubmed/8550953

Hettema J M, An S S, Neale M C, Bukszar J, Van Den Oord E J, Kendler K S, Chen X. Association between glutamic acid decarboxylase genes and anxiety disorders, major depression, and neuroticism. Molecular Psychiatry. Internet. 2006. 11(8):752-62. Available from: http://www.ncbi.nlm.nih.gov/pubmed/16718280

Clement J, Simler S, Ciesielski L, Mandel P, Cabib S, Puglisi-Allegra S. Age-dependent changes of brain GABA levels, turnover rates and shock-in-duced aggressive behaviour in inbred strains of mice. Pharmacology, biochemistry and behaviour. http://www.ncbi.nlm.nih.gov/pubmed/3562502

Thomassen A, Botker H E, Nielsen T T, Thygesen K, Henningsen P. Effects of glutamate on exercise tolerance and circulating substrate levels in stable angina pectoris. American Journal of Cardiology. 1990. 65(3):173-8. Available from: http://www.ncbi.nlm.nih.gov/pubmed/1967510

The invention claimed is:

1. A method of making a protein composition rich in glutamic acid, comprising: providing a coffee bean material; and extracting protein from said coffee bean material to produce a protein extract that comprises at least about 7% w/w glutamic acid.

2. The method of claim 1, wherein glutamic acid is the most abundant amino acid in said protein extract.

3. The method of claim 1, wherein said extracting step comprises treating said coffee bean material with at least one enzyme under conditions sufficient to extract protein from said coffee bean material.

4. The method of claim 3, wherein said at least one enzyme comprises one or more enzymes selected from L120 and L100.

5. The method of claim 1, wherein said extracting step is performed under aqueous conditions.

6. The method of claim 1, further comprising filtering said protein extract to produce a filtrate.

7. The method of claim 6, further comprising drying said filtrate.

8. The method of claim 7, further comprising making said filtrate into a powder.

9. The method of claim 1, wherein said coffee bean material comprises one or more materials selected from green coffee beans and roasted coffee beans.

10. The method of claim 1, wherein at least a portion of said coffee bean material is defatted.

11. The method of claim 1, wherein said protein extract comprises between about 30% and about 35% protein.

12. The method of claim 1, wherein said protein extract comprises between about 7% and about 8% glutamic acid.

13. The method of claim 1, wherein said protein extract comprises at least about 4% glycine.

14. The method of claim 1, wherein said protein extract comprises between about 4% and about 5% glycine.

15. The method of claim 1, further comprising formulating said protein extract as a powder, liquid, pill, tablet, pellet, capsule, thin film, solution, spray, syrup, linctus, lozenge, pastille, chewing gum, paste, vapor, suspension, emulsion, ointment, cream, lotion, liniment, drop, topical patch, buccal patch, bead, gummy, gel, sol, injection, or combinations thereof.

16. The method of claim 1, further comprising combining said protein extract with a dietary supplement, nutritional supplement, food, beverage, or combinations thereof.

* * * * *